No. 764,686. PATENTED JULY 12, 1904.
J. F. SHIFFERD.
GRIDIRON.
APPLICATION FILED SEPT. 30, 1903.
NO MODEL.

Witnesses
M. E. Corder.
Geo. E. Tew.

Inventor
Joseph F. Shifferd
by Milo B. Stevens & Co.
Attorneys

No. 764,686. Patented July 12, 1904.

UNITED STATES PATENT OFFICE.

JOSEPH F. SHIFFERD, OF CHICAGO, ILLINOIS.

GRIDIRON.

SPECIFICATION forming part of Letters Patent No. 764,686, dated July 12, 1904.

Application filed September 30, 1903. Serial No. 175,153. (No model.)

*To all whom it may concern:*

Be it known that I, JOSEPH F. SHIFFERD, a citizen of the United States, residing at Chicago, in the county of Cook and State of Illinois, have invented new and useful Improvements in Gridirons, of which the following is a specification.

This invention relates particularly to gridirons suitable for use upon gas or vapor stoves, and has for its particular object to provide a device which may be used as a flat-iron heater, a toaster or broiler, or as an oven.

A further object is to form a gridiron in which the heat is confined and retained and at the same time distributed by means of a deflector-plate, so as to avoid the liability of burning usually incident to devices of this kind in which the articles being toasted or cooked are exposed directly to the flame.

Other advantages of construction will be evident from the following description when read in connection with the accompanying drawings, in which—

Figure 1:
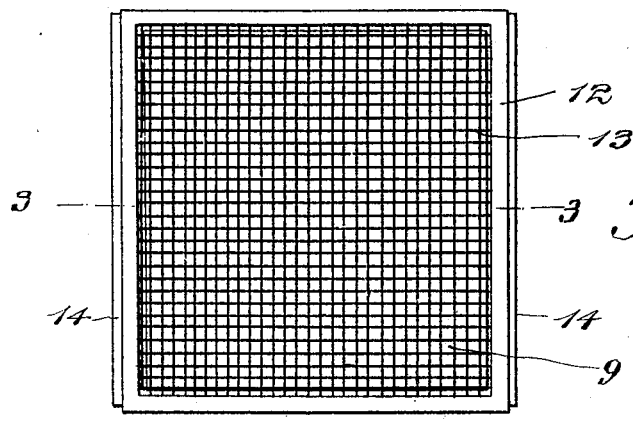
Figure 2:
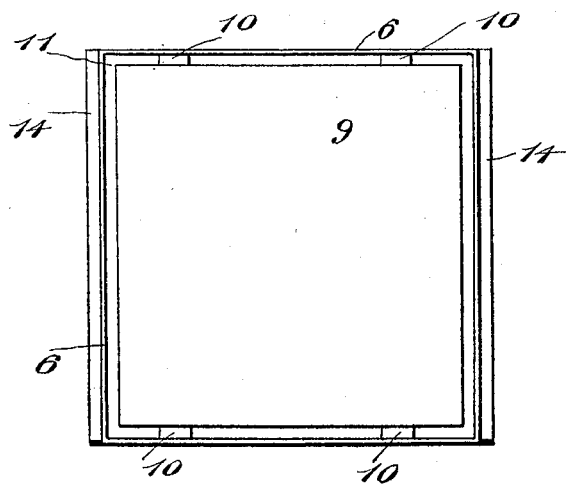
Figure 3:
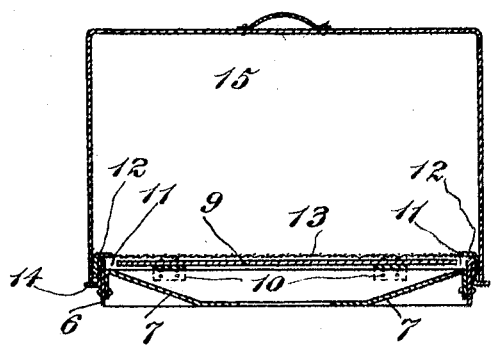

Figure 1 is a plan view of the device with the oven-cover removed. Fig. 2 is a similar view with the toasting-screen removed, and Fig. 3 is a vertical section.

Referring specifically to the drawings, 6 indicates a rectangular shell or casing which is adapted to be placed over and around the burner and serves to confine the flame and prevent the same from spreading and also to protect the same from drafts, which carry off the heat and lead to an excessive consumption of gas.

7 indicates a plate or sheet having a central opening and converging sides which incline from the upper edge of the casing inwardly and downwardly toward the flame. The opening is at the center of the plate and when the utensil is in use is located directly over the flame. Above this plate and spaced therefrom is a deflector-plate 9, made of sheet-iron and supported upon two metal bars 10, the ends of which are riveted to the casing. This plate is substantially flush with the top edge of the casing, but is of smaller size, so that a space 11 is left between the outer edge of the plate and the upper edge of the casing. The heat rising from the flame is confined and conveyed by the plate 7 to the outer edge of the deflector-plate, where it escapes through the space 11.

Adapted to fit over the upper edge of the casing is a toasting-screen consisting of a frame 12, formed of angle-iron or sheet-iron bent to an angular shape, and in this frame is woven-wire fabric 13. The depending flanges of the angle-iron fit over and around the upper edge of the casing to hold the screen in place; but the screen may be readily lifted and removed therefrom when desired.

From the sides of the casing outwardly-extending flanges 14 project to form a support for a closed cover 15, which when in use produces a heating chamber or oven and which may be placed or removed, as desired.

In use to heat flat-irons or the like the toaster-screen is removed, exposing the deflector-plate 9, upon which the irons can be placed. The flame is applied directly to this plate, which is accordingly heated to a high degree, and the sides of the casing and the plate 7 confine the heat, as above stated. A great saving of heat is thus effected in comparison with those constructions in which the burner and flame are open to drafts. For use as a toaster the screen is placed upon the casing, and the material being toasted is thus held out of contact with the deflector-plate, but in close proximity thereto, so that the desired result is speedily effected, and for use as an oven the cover may be applied in an obvious manner, whereby the heat rising between the casing and the edge of the deflector-plate will be retained.

What I claim as new, and desire to secure by Letters Patent, is—

A gridiron comprising a casing, a downwardly and inwardly inclined plate therein having a central opening, a heating and deflector plate above the same, spaced at its edges from the casing, and a removable toasting-screen having a frame around the outer
5 edge thereof with depending flanges which fit around the upper edge of the casing.

In testimony whereof I have signed my name to this specification in the presence of two subscribing witnesses.

JOSEPH F. SHIFFERD.

Witnesses:
SIGNA FELTSKOG,
H. G. BATCHELOR.